Patented Sept. 14, 1948

2,449,347

UNITED STATES PATENT OFFICE 2,449,347

HYDROGEN BROMIDE-CATALYZED OXIDATION OF ORGANIC COMPOUNDS

William E. Vaughan and Frederick F. Rust, Berkeley, Calif., assignors to Shell Development Company, San Francisco, Calif., a corporation of Delaware No Drawing. Application October 11, 1944, Serial No. 558,288

7 Claims. (Cl. 260—610)

This invention relates to the controlled nonexplosive oxidation of various organic compounds containing at least one replaceable hydrogen atom, and more particularly to an improved process for the obtaining of high yields of certain predetermined oxygenated products such as carboxylic acids, alcohols, ketones and organic peroxidic compounds by the catalytic oxidation of organic compounds, particularly hydrocarbons and their halo-substituted derivatives. The invention finds particular utility in the oxidation of branched-chain organic compounds, especially saturated hydrocarbons containing at least one tertiary carbon atom of aliphatic character, and of their products of partial halo-substitution, to produce high yields of peroxidic compounds, i. e. organic peroxides and/or hydroperoxides containing either the same or twice the number of carbon atoms per molecule as present in each molecule of the treated branched-chain organic material.

Although the oxidation of various hydrocarbons has been effected for a number of years both catalytically and non-catalytically, most if not all of these oxidations resulted in considerable decomposition of the hydrocarbons, i. e. cleavage of the carbon-to-carbon bonds thereof, with the resultant formation of large amounts of carbon dioxide, carbon monoxide, water, and oxygenated compounds containing a lesser number of carbon atoms per molecule than present in the treated organic material. Also, the products of reaction of such oxidations contain various percentages of hydrocarbons which have been oxidized to a greater or lesser extent. For instance, the catalytic oxidation of paraffinic hydrocarbons in accordance with the teachings of the prior art formed mixtures containing various percentages of carbon monoxide, carbon dioxide, olefins and water, as well as some aldehydes, alcohols, acids, acetals, esters, ketones and other oxygenated compounds containing varied numbers of carbon atoms per molecule due to the mentioned carbon-to-carbon bond scission as well as to other reactions, such as polymerization, condensation and the like.

It has been discovered that the above-mentioned and hereinbelow more fully described organic compounds may be subjected to a controlled non-explosive oxidation in the presence of a catalyst consisting of or comprising hydrogen bromide to produce high yields of the desired oxygenated products, such as the carboxylic acids, ketones, organic hydroperoxides and/or organic peroxides, containing at least the same number of carbon atoms per molecule as the starting organic material thus subjected to oxidation. For instance, U. S. Patent application Serial No. 474,-220, filed January 30, 1943, discloses and claims a process for the controlled partial and non-explosive oxidation of aliphatic and particularly saturated aliphatic hydrocarbons and of their products of partial halogenation to produce carboxylic acids and/or ketones having the same number of carbon atoms per molecule as the starting material treated. In accordance with the process disclosed and claimed in said application, this oxidation is effected by subjecting the stated saturated organic materials, e. g. ethane, propane or butane, as well as their products of halo-substitution, to the action of oxygen at an elevated temperature below that at which spontaneous combustion of the mixture occurs, this oxidation being effected in the presence of a catalyst comprising or consisting of hydrogen bromide. Also, U. S. patent application Serial No. 474,221, filed January 30, 1943, now abandoned, covers a process for the controlled, non-explosive oxidation of aromatic hydrocarbons and particularly of alkylated aromatic hydrocarbons to produce phenol, substituted phenols, aromatic carboxylic acids, ketones and the like having the same number of carbon atoms per molecule as the starting material, this oxidation being effected at an elevated temperature (which is preferably above about 100° C. but below the temperature capable of causing spontaneous combustion) and in the presence of hydrogen bromide employed as the catalyst. U. S. Patent No. 2,369,181, discloses and claims a similar process for the production of predetermined oxygenated products by the catalytic oxidation, under non-explosive conditions and in the presence of hydrogen bromide, of alicyclic hydrocarbons and of their halogenated derivatives; while U. S. Patent No. 2,395,523, covers a process for the production of novel organic peroxides and organic hydroperoxides by the controlled oxidation of unsubstituted or halo-substituted isoparaffins such as isobutane, isopentane and the like. U. S. Patent No. 2,369,523, is directed to the production of certain unsaturated carboxylic acids and/or ketones by the controlled hydrogen bromide-catalyzed oxidation under non-explosive conditions of unsaturated organic compounds, e. g. unsaturated aliphatic hydrocarbons, while U. S. Patent No. 2,373,240 covers a process for the production of unsubstituted and halo-substituted unsaturated carboxylic acids by the controlled hydrogen bromide-catalyzed oxidation of halogenated unsaturated hydrocarbons. In all of these cases the controlled oxidation is effected in the presence of a catalyst consisting of or comprising hydrogen bromide which may be introduced as such into the reaction zone or formed in situ under the operating conditions employed. The above-mentioned inventions are predicated on the discovery that the presence of hydrogen bromide during the oxidation of the defined class of organic compounds controls the oxidation reaction so that said oxidation occurs on the carbon atom or atoms to which a halogen atom would usually attach itself if the starting organic material were subjected to a halo-substitution reaction, and also on the fact that the presence of hydrogen bromide, besides retarding the explosion or complete combustion of organic starting material, and in addition to the apparent catalytic effect of initiating the chain reaction mechanism, also has the effect of inhibiting decomposition of the carbon structure of such organic starting materials so that the resultant oxygenated compounds contain at least the same number of carbon atoms per molecule as the starting material. Compounds which may be used in the hydrogen bromide-catalyzed oxidations comprise all organic compounds which contain at least one replaceable hydrogen atom. As such, reference is made to aliphatic hydrocarbons, particularly unsaturated aliphatic hydrocarbons, as well as aromatic hydrocarbons, alkylated aromatic hydrocarbons, alicyclic hydrocarbons (which may or may not contain one or more saturated or unsaturated aliphatic side chains), as well as their derivatives such as products of partial halo-substitution, nitrides, ketones, alcohols, acids, etc. A particularly suitable class of compounds which may be used in the practice of this invention comprises organic compounds containing a tertiary carbon atom of aliphatic character, and may therefore be generally represented by the formula

wherein each R represents a like or different alkyl, aryl, aralkyl, alkaryl, alicyclic or heterocyclic radical, two of which together may form an alicyclic ring, and which radicals may be further substituted for instance by the presence of one or more halogen, nitrogen, or oxygen atoms in such radicals. The preferred class of organic compounds which may be used as the starting material comprises the saturated aliphatic hydrocarbons containing at least one tertiary carbon atom, as well as their halo-substituted derivatives in which one or more halogen atoms are attached to any one or several carbon atoms of the various alkyl radicals which are in turn attached to the tertiary carbon atom carrying a replaceable hydrogen atom. The process is particularly applicable to the treatment of unsubstituted and halo-substituted normally gaseous saturated aliphatic hydrocarbons containing at least one tertiary carbon atom. The following is a non-limiting, representative list of saturated aliphatic hydrocarbons (containing at least one tertiary carbon atom) which may be oxidized in accordance with the above-mentioned and hereinbelow more fully discussed process: isobutane, 2-methyl butane, 2-ethyl butane, 2-methyl pentane, 3-methyl pentane. 2.3-dimethyl butane, 2.4-dimethyl butane, and their homologs. The halogenated derivatives may contain one or more halogen atoms attached to primary and/or secondary carbon atoms so that the tertiary carbon atom or atoms contain a replaceable hydrogen atom. Examples of these compounds are: 1-halo-2-methyl propane, 1-halo-2-ethyl propane, 1-halo-2-methyl butane, 1-halo-3-methyl butane, 2-halo-3-methyl butane, and the like and their homologs. Also, one or more of the aliphatic radicals attached to the tertiary carbon atom may be substituted by an aryl or aralkyl radical, examples of such compounds being isopropyl benzene, 1-phenyl-1-methyl propane, 1-phenyl-2-methyl propane, and the like. The following is a representative list of other organic compounds which may be treated in accordance with the process of the invention: straight-chain aliphatic hydrocarbons such as ethane, propane, n-butane, n-pentane, and the like; alicyclic hydrocarbons, e. g. cyclobutane, cyclopentane, and their homologs; alkylated cycloparaffins such as methyl cyclopentane, methyl cyclohexane, and the like; aromatic and substituted aromatic hydrocarbons such as naphthalene, toluene, xylenes, ethyl benzene, n-propyl benzene, butyl benzenes, cumene, cymene, durene, and the like; and the partially halo-substituted derivatives of the above-mentioned hydrocarbons, e. g. ethyl chloride, dichlorethane, dibrompropanes, monochlor cyclopentane, benzyl chloride, benzyl bromide and the like. Instead of employing individual members of the above class, mixtures containing one or more of the above organic compounds or of these compounds with other organic compounds may also be subjected to the hydrogen bromide-catalyzed oxidation.

Although the hydrogen bromide-catalyzed oxidation may be effected in the liquid, vapor or a two-phase liquid-vapor system, it is generally preferred to conduct the reaction in the vapor phase because it is difficult to maintain a desirable relatively high oxygen concentration when the reaction is conducted in the liquid state.

Without any intention of being limited by any theory of the case, it is believed at the present time that the partial, controlled hydrogen bromide-catalyzed oxidation of the mentioned organic compounds is, particularly when conducted in the vapor state, mainly a homogeneous gas reaction which, however, is initiated at the wall surfaces of the reactor. It has now been discovered that the above-mentioned hydrogen bromide-catalyzed oxidation reaction proceeds rapidly and without explosion when effected in an unpacked reaction tube or vessel, and that a high ratio of free space to surface in the reaction vessel is favorable to the formation of the desired oxygenated compounds. Additionally, it has been discovered that the use of unpacked reaction vessels having a high ratio of free space to surface in the above-mentioned oxidation of branched-chain organic compounds results not only in a high rate of oxygen consumption but also favors the formation of a reaction product containing high yields of valuable organic hydroperoxides and peroxides. It has been still further discovered that the hydrogen bromide-catalyzed oxidation of the mentioned organic compounds, when effected in packed vessels or in vessels having a small ratio of free space to surface, is not conducive to the formation of oxygenated reaction products, and that the use of such packed vessels or those having a small ratio of free space to surface in the hydrogen bromide-catalyzed oxidation of branched-chain compounds of the type of saturated aliphatic hydrocarbons containing a tertiary carbon atom is not conducive to the formation of reaction products containing any appreciable amounts of desired peroxidic compounds, but instead thereof tends to form reaction products containing large percentages of oxygenated compounds of the type of ketones and/or alcohols. Therefore, in order to obtain and recover high yields of peroxidic compounds, the size and shape of the reaction vessel employed for the oxidation of branched-chain organic compounds with oxygen, in the presence of hydrogen bromide and at elevated temperatures, is important. In fact, the yield of tertiary alkyl hydroperoxide and/or of di(tertiary alkyl) peroxide is increased by increasing the size of the reaction vessel, i. e. by increasing the ratio of free space to reactor wall surface. For instance, as will be brought out in the examples, when hydrogen bromide-catalyzed oxidation of isobutane is carried out in a Pyrex glass tube having an 8 mm. internal diameter, only small amounts of tertiary butyl hydroperoxide are obtained, the reaction products containing large amounts of acetone. However, the use of a reaction tube having an internal diameter of 25 mm., other conditions being maintained equal, greatly increases the recoverable yield of tertiary butyl hydroperoxide and at the same time substantially inhibits the production of ketones. The most efficient reaction vessel is one in which there is a high ratio of volume to surface and through which the vapors or gaseous mixture can pass freely without prolonged contact with the reactor walls.

The present invention is predicated on the discovery that the yield of the desired oxygenated products, e. g. hydroperoxides and/or peroxides, during the hydrogen bromide-catalyzed oxidation of organic compounds, such as tertiary carbon atom-containing saturated aliphatic hydrocarbons, is increased materially by increasing the ratio of free space to surface. Thus, all other conditions being equal, a cylindrical reactor with a 5 inch radius will be more efficient for the operation of the present process than one with a radius of 1 inch. An unpacked tube of about 1 inch in diameter represents about the smallest vessel affording a high enough ratio of free space to surface to enable the process to be carried out in an experimental way for the production of any appreciable quantity of tertiary alkyl hydroperoxide and di(tertiary alkyl) peroxide. This discovery that large reaction vessels give better yields than small ones, together with the discovery that an increase of exposed surface is unfavorable to the production and subsequent recovery of peroxidic compounds shows that in carrying out the process on a commercial scale, i. e. using large converters where the ratio of free space to surface is high, the yields of the peroxides will be greater than with operation on a small scale. For commercial and semi-commercial scale operations of this process, spherical or cylindrical shape converters are practical.

The non-explosive hydrogen bromide-catalyzed oxidation of the specified compounds may be effected in the above-mentioned reaction vessels having a high free space to surface ratio at temperatures below those at which spontaneous combustion or substantial decomposition of the carbon structure occurs. This upper temperature limit will depend at least in part on the specific organic substance treated and on the proportions thereof and of the oxygen and hydrogen bromide present in the vaporous mixture subjected to the elevated temperatures. Generally, and with particular reference to the treatment of branched-chain paraffins, the upper temperature limit is in the neighborhood of about 200° C., although some of the more stable organic compounds may be heated to higher temperatures, e. g. about 300° C. and higher, particularly in the presence of inert diluents, without causing the mixture to decompose. The high temperatures, even though they may be below the explosive region, should also be avoided because of certain undesirable side reactions such as excessive conversion of hydrogen bromide to organic bromides. Although the upper temperature limit was mentioned to be in the neighborhood of about 200° C., with shorter contact periods the temperature may be raised above the mentioned limit without causing undesirable side reactions. However, some of the more readily oxidizable compounds may be economically oxidized according to the present process at lower temperatures, for example between about 180° C. and about 150° C., or below. With further decrease in the operating temperature the output of desired peroxides per unit of time will decrease so that at temperatures of below about 100° C. the controlled oxidation, although still operable, may become uneconomical.

Although the volumetric ratios of the mentioned organic starting material to oxygen may vary within relatively wide limits, it may be stated that satisfactory yields of the desired oxygenated compounds, e. g. hydroperoxides and/or diperoxides, may be obtained by using equivolumetric quantities thereof. With an increase in the ratio of oxygen to the organic material there is an increase in the rate of formation of the peroxides. However, any undue increase in this ratio is generally dangerous because of explosion hazards. The use of oxygen to hydrocarbon ratios considerably below equivolumetric generally lowers the output of the desired oxygenated compounds per unit of time but at the same time increases the rate of consumption of oxygen and lessens potential explosion hazards.

The concentration of the hydrogen bromide in the reaction mixture may also vary within relatively wide limits. When applied to the oxidation of branched-chain paraffins, the use of relatively high concentrations of the hydrogen bromide tends to favor the production of high yields of di(tertiary organic) peroxides, whereas with relatively lower hydrogen bromide concentrations, other conditions being equal, the reaction mixture predominates in the desired organic hydroperoxides. The reaction may also be effected at atmospheric or superatmospheric pressures although it is preferred to realize the reaction at superatmospheric pressures because under such conditions it is possible to obtain the desired controlled oxidation while using lower hydrogen bromide catalyst concentrations.

The discovery of the homogeneous nature of the reaction and of the necessity of using for this purpose reaction vessels having a high ratio of free space to surface are illustrated by the following examples. Unless otherwise specified, the volumes of the various compounds are expressed as gases at room temperature and at atmospheric pressure.

*Example I*

The reactor consisted of a coil of glass tubing having an internal diameter of 8 mm. (0.315 in.). This coil, which was approximately 180 feet in length, had a volume equal to about 3 liters and was immersed in an oil bath, thus permitting accurate control of the reaction temperature. Three individual runs were conducted with this reactor, at temperatures of 160° C., 165° C. and 175° C., respectively. In each case a preheated vaporous mixture of isobutane, oxygen and hydrogen bromide was conveyed through this reactor at such a rate that approximately 314 cc. of isobutane, 250 cc. of oxygen and 36 cc. of hydrogen bromide were conveyed through the coil per minute. The contact time was thus equal to about 3 minutes. The reaction products from each of the runs were then analyzed to determine oxygen consumption, and the rates of production of tertiary butyl hydroperoxide and of ketone. These results are presented in the following table:

| | Temperature | | |
|---|---|---|---|
| | 160° C. | 165° C. | 175° C. |
| Oxygen consumed, cc./min | 87 | 97 | 174 |
| Tertiary butyl hydroperoxide produced, cc./min | 4.4 | 5.7 | 5.1 |
| Ketones produced, cc./min | 21 | 35 | 83 |
| Ratio of ketones to tertiary butyl hydroperoxide | 4.8 | 6.1 | 16.4 |

Example II

The reactor employed consisted of a glass tube or coil having an internal diameter of about 25 mm. (about 1 inch), this coil having a volume of about 3 liters, and was also immersed in an oil bath for purposes of temperature control. The vaporous mixture conveyed through this reactor was of the same composition as that employed in the preceding example. Two runs were made at temperatures of 150° C. and 155° C., respectively. The results of these oxidations are presented in the following table:

| | Temperature | |
|---|---|---|
| | 150° C. | 155° C. |
| Oxygen consumed, cc./min | 164 | 216 |
| Tertiary butyl hydroperoxide produced, cc./min | 110 | 169 |
| Ketones produced, cc./min | <1 | <1 |
| Ratio of ketones to tertiary butyl hydroperoxide | <0.01 | <0.01 |

A comparison of the results obtained in the above two examples demonstrates the desirability of effecting the oxidation in reactors having a high ratio of volume to surface. Thus the use of a 25 mm. coil not only permitted the realization of the reaction at temperatures somewhat lower than those necessary when using a reactor having an 8 mm. internal diameter, but also the use of reactors having a higher free space to surface ratio increased oxygen consumption and at the same time resulted in the formation of reaction products which contained high yields of tertiary butyl hydroperoxide and substantially no ketones, which latter are the main reaction products obtained from the same type of hydrogen bromide-catalyzed oxidation in reactors of low volume to surface ratios.

In order to reduce the surface effect in coils having a small bore, the runs described in Example I were repeated except for the fact that these runs were effected at a pressure of 2 atmospheres absolute, instead of the one atmosphere employed in the first runs. It was found that some improvement in the rate and yield was accomplished by doubling the pressure. However, the production of ketones was still very high and in fact the ketone to tertiary butyl hydroperoxide ratio varied between about 2.1 and 3.6, depending on the temperature employed. The use of still higher pressures will tend to offset the formation of products of decomposition.

Example III

The reactor employed in this run consisted of a Pyrex glass cylindrical vessel having a 3 inch internal diameter. This reactor was 10 inches long. A vaporous mixture of isobutane, oxygen and hydrogen bromide was conveyed through the reactor at 2 atmospheres of pressure at such a rate that 1.64 moles of isobutane, 0.82 mole of oxygen, and 0.10 mole of hydrogen bromide were conveyed through the reactor per liter of reactor space per hour. The temperature in the reactor varied from a bottom temperature of 176° C. to a top temperature of 192° C. An analysis of the reaction products showed that the oxygen consumption was over 95% and that 0.08 volume of liquid product were produced per volume per hour. This liquid product predominated in tertiary butyl hydroperoxide and di(tertiary butyl) peroxide and contained only 0.4% of acetone. Only very minor amounts of carbon dioxide and carbon monoxide were produced.

In another run effected under the same conditions an increase in the reaction temperature to between 182° C. and 202° C. doubled the yield of liquid products which contained about 62% tertiary butyl hydroperoxide, 20% di(tertiary butyl) peroxide, and only about 0.7% acetone.

The volume-to-surface ratio of a given cylindrical (tubular) vessel may be expressed by the following formula:

$$\frac{V}{S} = \frac{\pi r^2 L}{2\pi r L}$$

wherein V is the volume, S represents the surface, r is the radius of the vessel, and L is its length. Obviously, this ratio may also be represented by the formula $$\frac{V}{S} = \frac{r}{2}$$

Therefore, if all of the linear dimensions in either or both of the above formulas are given in inches, and since it was stated that an unpacked tube of about one inch in diameter represents about the smallest vessel affording a high enough ratio of free space to surface to enable the effecting of the process, the approximate minimum volume-to-surface ratio in such a case may be represented as follows:

$$\frac{V}{S} = \frac{\pi \cdot (0.5)^2 \cdot L}{2 \cdot \pi \cdot 0.5 \cdot L} = \frac{0.5}{2} = 0.25$$

It is to be noted that the volume-surface ratio of the coil used in Example I (when its linear dimensions are expressed in inches) is equal to about 0.0787, while that of the reactor employed for the runs of Example II is about 0.25. When expressed in the same units, the volume-surface ratio of the reactor described in Example III is equal to 0.75.

Example IV

A 2:2:1 vaporous mixture of ethane, oxygen and hydrogen bromide was introduced into an unpacked Pyrex glass reactor and subjected therein to a temperature of about 195° C. At the end of about 15 minutes the pressure in the reactor had dropped approximately 34 mm. In another run effected under identical conditions except for the fact that the surface-volume ratio was increased by a factor of 3.5 by packing the interior of the reactor with glass rods, the pressure drop at the end of 15 minutes was equal to about 14 mm. A comparison of these two results shows the beneficial effect of employing unpacked reactors having a high volume-to-surface ratio for the oxidation of straight-chain aliphatic hydrocarbons since the use of the unpacked reactors increases the rate of reaction and of the production of desired reaction products.

While the reaction on which the above-described process is based has been found to be predominantly a homogeneous gas reaction, it was pointed out that the reaction is apparently initiated at the walls. The effect of the material of which the walls of the reaction vessel are made on the reaction also shows that a part of the reaction takes place or is initiated on the surface of the reaction vessel. It has been found that using reaction vessels of different materials or coated with different substances influences the yields of the products of this process. Vessels of siliceous material such as glass, porcelain, or clay, or lined with such materials, are suitable; satisfactory results are obtained with Pyrex glass reactors. However, the influence of the character of the surface material is less important when the reaction vessels employed for the mentioned hydrogen bromide catalyzed oxidation have high volume-to-surface ratios.

We claim as our invention:

1. A process for the production of peroxidic compounds selected from the group consisting of tertiary butyl hydroperoxide, di(tertiary butyl) peroxide and mixtures thereof, which comprises reacting substantially equivolumetric vaporous amounts of isobutane and oxygen at a temperature of between about 150° C. and about 200° C. in the presence of hydrogen bromide employed in a volumetric amount equal to about one half that of the isobutane in free space in a reaction vessel having a volume-to-surface ratio not less than 0.25 when all of the linear dimensions of the vessel are expressed in inches.

2. A process for the production of peroxidic compounds which comprises reacting a vaporous mixture comprising substantially equivolumetric amounts of isobutane and oxygen, at a temperature of between about 100° C. and the temperature at which spontaneous combustion of the mixture occurs, in the presence of hydrogen bromide employed in a volumetric amount equal to about one half that of the isobutane in free space in a cylindrical reaction vessel having a volume-to-surface ratio not less than 0.25 when all of the linear dimensions of the vessel are expressed in inches.

3. A process for the production of peroxidic compounds which comprises subjecting a vaporous mixture comprising oxygen and a saturated aliphatic hydrocarbon containing a tertiary carbon atom to the action of hydrogen bromide, at a temperature of between about 100° C. and the temperature at which spontaneous combustion will occur, and effecting said reaction in a free space in a reaction vessel having a volume to surface ratio not less than 0.25 when all of the linear dimensions of the vessel are expressed in inches.

4. A process for the production of acetic acid which comprises reacting substantially equivolumetric vaporous amounts of ethane and oxygen in the presence of hydrogen bromide employed in a volumetric amount equal to about one half that of the ethane at a temperature of about 200° C. and in free space in a reaction vessel having a volume to surface ratio not less than 0.25 when all of the linear dimensions of the vessel are expressed in inches.

5. A process for the production of acetic acid which comprises subjecting ethane and oxygen to the action of hydrogen bromide, at a temperature of between about 100° C. and the temperature at which spontaneous combustion will occur, and in free space in a reaction vessel having a volume-to-surface ratio not less than 0.25 when all of the linear dimensions of the vessel are expressed in inches.

6. In a process for the controlled oxidation of saturated aliphatic hydrocarbons, the steps of subjecting vapors of a saturated aliphatic hydrocarbon to the action of oxygen, in the presence of hydrogen bromide and at a temperature of between about 100° C. and that at which spontaneous combustion will occur, and effecting said reaction in free space in a reaction vessel having a volume to surface ratio not less than 0.25 when all of the linear dimensions of the vessel are expressed in inches.

7. A process for the controlled oxidation of hydrocarbons which comprises subjecting vapors of a saturated lower aliphatic hydrocarbon to the action of oxygen in the presence of hydrogen bromide and at a temperature of between about 100° C. and that at which spontaneous combustion will occur, the oxidation reaction being effected in free space in a reaction vessel having a volume to surface ratio not less than 0.25 when all of the linear dimensions of the vessel are expressed in inches.

WILLIAM E. VAUGHAN.
FREDERICK F. RUST.

REFERENCES CITED

The following references are of record in the file of this patent:

UNITED STATES PATENTS

| Number | Name | Date |
| --- | --- | --- |
| 2,115,207 | Milas | Apr. 26, 1938 |
| 2,298,387 | Kenyon | Oct. 13, 1942 |
| 2,353,159 | Hull | July 11, 1944 |